US012148288B2

(12) United States Patent
Phillips et al.

(10) Patent No.: US 12,148,288 B2
(45) Date of Patent: Nov. 19, 2024

(54) ILLUMINATED POLE SYSTEM FOR HYDRANTS

(71) Applicant: Colletonphillips LLC, Perth Amboy, NJ (US)

(72) Inventors: Charles B. Phillips, Perth Amboy, NJ (US); Storm N. Colleton, Aberdeen, NJ (US)

(73) Assignee: Colletonphillips LLC, Perth Amboy, NJ (US)

(*) Notice: Subject to any disclaimer, the term of this patent is extended or adjusted under 35 U.S.C. 154(b) by 54 days.

(21) Appl. No.: 18/303,791

(22) Filed: Apr. 20, 2023

(65) Prior Publication Data

US 2024/0355181 A1 Oct. 24, 2024

(51) Int. Cl.
*G08B 5/36* (2006.01)

(52) U.S. Cl.
CPC .................................... *G08B 5/36* (2013.01)

(58) Field of Classification Search
CPC ..................................................... G08B 5/36
See application file for complete search history.

(56) References Cited

U.S. PATENT DOCUMENTS 5,727,103 A * 3/1998 Matsusaka ........... G02B 6/4202 385/901
6,124,796 A 9/2000 Hincher
6,402,338 B1 * 6/2002 Mitzel ..................... F21S 9/037 362/183
6,758,160 B1 7/2004 Martin
7,017,602 B2 3/2006 Garver
8,614,745 B1 12/2013 Al Azemi
9,217,242 B1 * 12/2015 Jones ........................ E03B 9/04
10,169,962 B1 * 1/2019 Walker ..................... G08B 5/36
11,624,674 B2 * 4/2023 Gibson ............... F16L 55/1152 73/592
2007/0120664 A1 5/2007 Bilbrey
2009/0128355 A1 5/2009 Urbin
2012/0306384 A1 * 12/2012 Chen ...................... H05B 47/19 315/159
2013/0222194 A1 * 8/2013 Albert .................... H01Q 1/225 343/872

* cited by examiner

*Primary Examiner* — Thomas D Alunkal
(74) *Attorney, Agent, or Firm* — Neustel Law Offices

(57) ABSTRACT

Illumination systems for illuminating a hydrant to improve visible detection of the hydrant. An illumination system may include a housing and a lighting module. The housing includes a mount portion configured to engage onto a projecting support that extends upwardly to position the housing above the hydrant. The lighting module may include an antenna configured to receive an electromagnetic signal, a battery configured to provide electrical power, and at least one light source operatively coupled to the battery and to the antenna, the at least one light source being configured to emit light outwardly from the housing in response to the electromagnetic signal received by the antenna.

21 Claims, 4 Drawing Sheets

ILLUMINATED POLE SYSTEM FOR HYDRANTS

CROSS REFERENCE TO RELATED APPLICATIONS

Not applicable to this application.

STATEMENT REGARDING FEDERALLY SPONSORED RESEARCH OR DEVELOPMENT

Not applicable to this application.

FIELD OF THE INVENTION

The present disclosure in general relates to an illumination system for marking hydrants, and more specifically, to a pole-mounted illumination system that is wirelessly activated to help first responders locate the hydrant.

BACKGROUND

It may be difficult for first responders to locate a fire hydrant when necessary. Because some emergencies occur at night, for example, darkness may prevent emergency personnel from quickly locating a nearby hydrant. In some circumstances, falling rain or snow may reduce visibility and may partially or completely obscure a hydrant from view. And in cases where first responders are arriving from neighboring communities to assist with an emergency situation, the visiting personnel may not be familiar with the locations of hydrants in the area of the emergency.

It is generally known to provide a reflective pole that extends upwardly from the hydrant to improve the visibility of the hydrant. For example, FIG. 1 is a perspective view of a hydrant 50 in accordance with the prior art. The hydrant 50 is equipped with a pole 52 that extends upwardly from a top portion of the hydrant 50 by a suitable distance (e.g. five feet). In some instances, the pole 52 is made of a fiberglass material, and is painted with reflective paint (e.g. red and white stripes) to more readily reflect light to improve visibility. Although desirable results have been achieved using poles 52 to help indicate the locations of hydrants 50, there is room for improvement.

SUMMARY

Some of the various embodiments of the present disclosure relate to an illumination system for illuminating a hydrant to improve visible detection of the hydrant. More specifically, some of the various embodiments include an illumination system for illuminating a hydrant having a pole extending upwardly therefrom to improve visible detection of the hydrant (and the pole).

In some embodiments, an illumination system for illuminating a hydrant to improve visible detection of the hydrant comprises a housing having a mount portion configured to engage onto a projecting support that extends upwardly to position the housing above the hydrant, and a lighting module at least partially disposed within the housing. In some embodiments, the lighting module includes an antenna configured to receive an electromagnetic signal, a battery configured to provide electrical power, and at least one light source operatively coupled to the battery and to the antenna, the at least one light source being configured to emit light outwardly from the housing in response to the electromagnetic signal received by the antenna.

In addition, in some embodiments, an illumination system for illuminating a hydrant having a pole extending upwardly therefrom to improve visible detection of the hydrant 50 comprises a housing having a mount portion defining an aperture that fittingly engages onto an upper end of the pole to position the housing above the hydrant, and a lighting module at least partially disposed within the housing. In some embodiments, the lighting module includes an antenna configured to receive an electromagnetic signal, a battery configured to provide electrical power, and at least one light source operatively coupled to the battery and to the antenna, the at least one light source being configured to emit light outwardly from the housing in response to the electromagnetic signal received by the antenna. The illumination system may further include a transmitter module configured to be positioned remotely from the housing, the transmitter module being configured to transmit the electromagnetic signal to the antenna to actuate the at least one light source.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally 24 either identical or at least similar in function or purpose.

DETAILED DESCRIPTION

A. Overview

Some of the various embodiments of the present disclosure relate to an illumination system for illuminating a hydrant to improve visible detection of the hydrant. More specifically, some of the various embodiments include an illumination system for illuminating a hydrant having a pole extending upwardly therefrom to improve visible detection of the hydrant (and the pole). Embodiments of illumination systems in accordance with the present disclosure may advantageously improve the visibility of a hydrant during periods of poor visibility (e.g. during night, inclement weather, smoky conditions, etc.), or may assist first responders who may generally be unfamiliar with the locations of hydrants in the area near an emergency incident to which they are responding.

Figure 1:
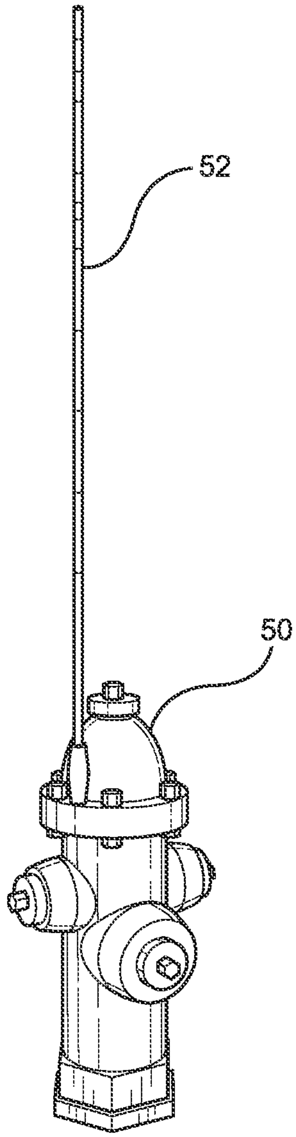
FIG. 1 (Prior Art)
FIG. 1 is a perspective view of a hydrant in accordance with the prior art.
Figure 2:
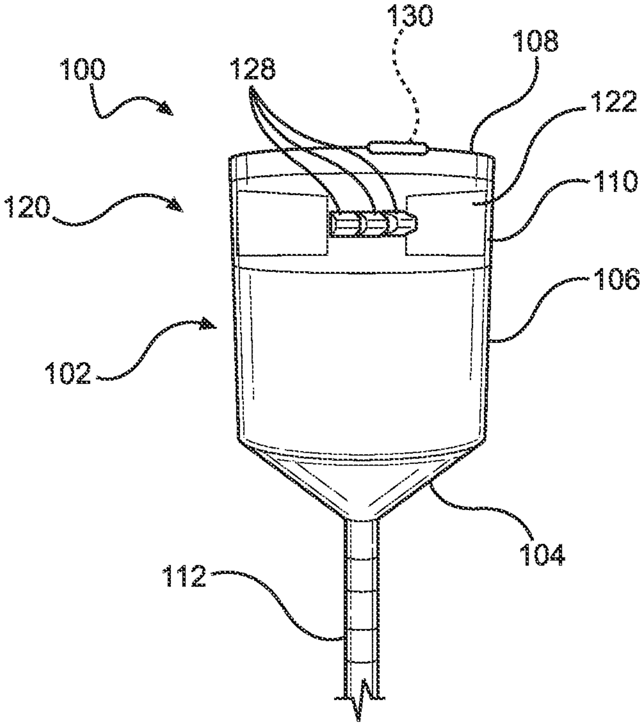
FIG. 2 is a perspective view of an illumination system in accordance with an example embodiment.
Figure 3:
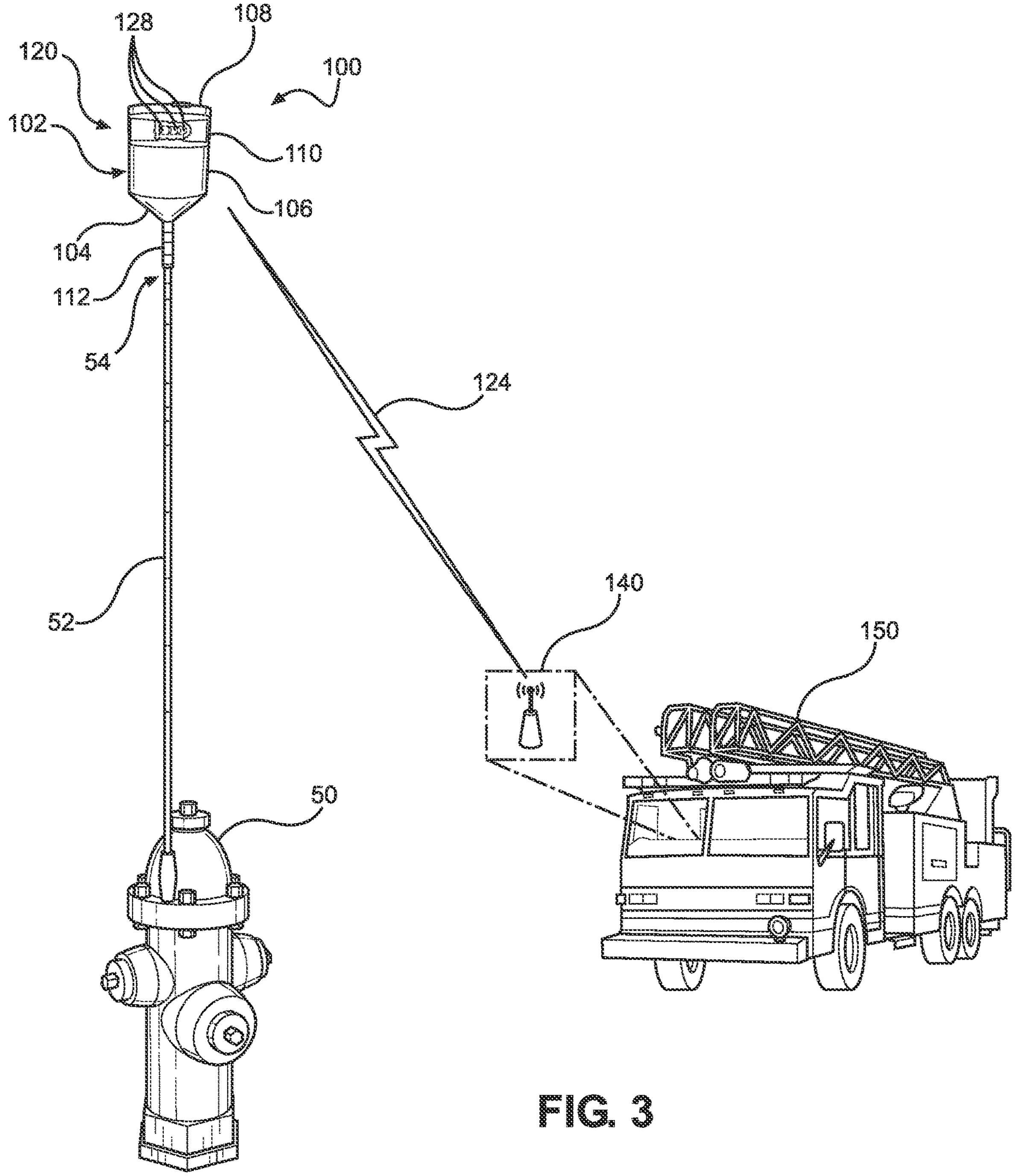
FIG. 3 is a perspective view of the illumination system of FIG. 2 mounted on a pole of a hydrant in accordance with an example embodiment.

For example, FIGS. 2 and 3 are perspective views of an illumination system 100 for illuminating a hydrant 50 having a pole 52 extending upwardly therefrom to improve visible detection of the hydrant 50. In some embodiments, the illumination system 100 includes a housing 102 having a mount portion 112 configured to engage onto an upper end 54 of the pole 52, and a lighting module 120 at least partially disposed within the housing 102. In some embodiments, the lighting module 120 includes an antenna 122 configured to receive an electromagnetic signal 124, a battery 126 (FIG. 4) configured to provide electrical power, and at least one light source 128 operatively coupled to the battery 126 and to the antenna 122. The light source 128 is configured to receive electrical power from the battery 126 and to emit light outwardly from the housing 102 in response to the electromagnetic signal 124 received by the antenna 122.

As further shown in FIG. 3, in some embodiments, the illumination system 100 further includes a transmitter module 140 configured to be positioned remotely from the housing 102 and configured to transmit the electromagnetic signal 124 to the antenna 122 to actuate the at least one light source 128. For example, in some embodiments, the transmitter module 140 may be a mobile device that may be carried by a person (e.g. fireman, police officer, etc.), or may be positioned within a vehicle 150 (e.g. a firetruck, etc.). In some embodiments, the transmitter module 140 may transmit the electromagnetic signal 124 when the transmitter module 140 is actuated by the person, or alternately, the transmitter module 140 may be configured to automatically emit the electromagnetic signal 124, such as whenever the vehicle 150 is running, or alternately, whenever the transmitter module 140 is in a pre-determined proximity to a designated location or area (e.g. an address or coordinates associated with a fire or other emergency situation).

These and other aspects of various embodiments of illumination systems for illuminating a hydrant to improve visible detection of the hydrant in accordance with the present disclosure are described in further detail below with reference to the accompanying figures.

B. Housing

As shown in FIGS. 2-3, in some embodiments, the illumination system 100 includes a housing 102 having a base portion 104, a central portion 106, and a top portion 108. The housing 102 may be a substantially enclosed compartment that contains one or more of the other components of the illumination system 100 (e.g. light source 128, battery 126, antenna 122, etc.). For example, in some embodiments, the central portion 106 of the housing 102 may be a generally cylindrical housing, and the top portion 108 generally encloses a first end of the central portion 106. Similarly, the base portion 104 generally encloses a second 21 end of the central portion 106.

In some embodiments, the central portion 106 of the housing 102 includes at least one window 110 that enables light to be transmitted outwardly from the housing 102. For example, in the embodiment shown in FIG. 2, the window 110 circumferentially surrounds the upper end of the central portion 106 proximate the top portion 108. In some embodiments, the window 110 may be tinted to a desired color (e.g., red) to provide a desired visibility to persons who may be attempting to locate a hydrant 50.

As noted above, the base portion 104 of the housing may include a mount portion 112 that is configured to engage onto an upper end 54 of the pole 52. For example, as shown in FIGS. 2-3, the base portion 104 may be a tapered (or conical) portion, and the mount portion 112 may include a cylindrical or tubular member that projects downwardly from the base portion and includes a cylindrical aperture that slides onto and fittingly engages the upper end 54 of the pole 52.

Accordingly, in some embodiments, an illumination system (e.g. illumination system 100) for illuminating a hydrant 50 to improve visible detection of the hydrant 50 comprises a housing 102 having a mount portion 112 configured to engage onto a projecting support (e.g. pole 52) that extends upwardly to position the housing 102 above the hydrant 50, and a lighting module 120 at least partially disposed within the housing 102. In some embodiments, the lighting module 120 includes an antenna 122 configured to receive an electromagnetic signal 124, a battery 126 configured to provide electrical power, and at least one light source 128 (e.g. light-emitting diode) operatively coupled to the battery 126 and to the antenna 122, the at least one light source being configured to emit light outwardly from the housing 102 in response to the electromagnetic signal 124 received by the antenna 122.

In some embodiments, the projecting support comprises a pole 52 that projects upwardly from the hydrant 50, and the mount portion 112 includes a cylindrical aperture that slides onto and fittingly engages an upper end 54 of the pole 52. And in some embodiments, the mount portion 112 includes a tubular member that projects downwardly from a base portion 104 of the housing 102, the tubular member defining a cylindrical aperture that slides onto and fittingly engages the upper end 54 of the pole 52.

In addition, in some embodiments, the housing 102 includes at least one window 110, the at least one light source 128 being configured to emit light outwardly from the housing 102 through the at least one window 110. Moreover, in some embodiments, the housing 102 comprises a central portion 106 having a cylindrical shape and at least one window 110 circumferentially disposed about the central portion 106, the at least one light source 128 being configured to emit light outwardly from the housing 102 through the at least one window 110. In some embodiments, the housing 102 includes at least one window 110 formed of a tinted transparent material, the at least one light source 128 being configured to emit light outwardly from the housing 102 through the at least one window 110.

C. Lighting Module

Figure 4:
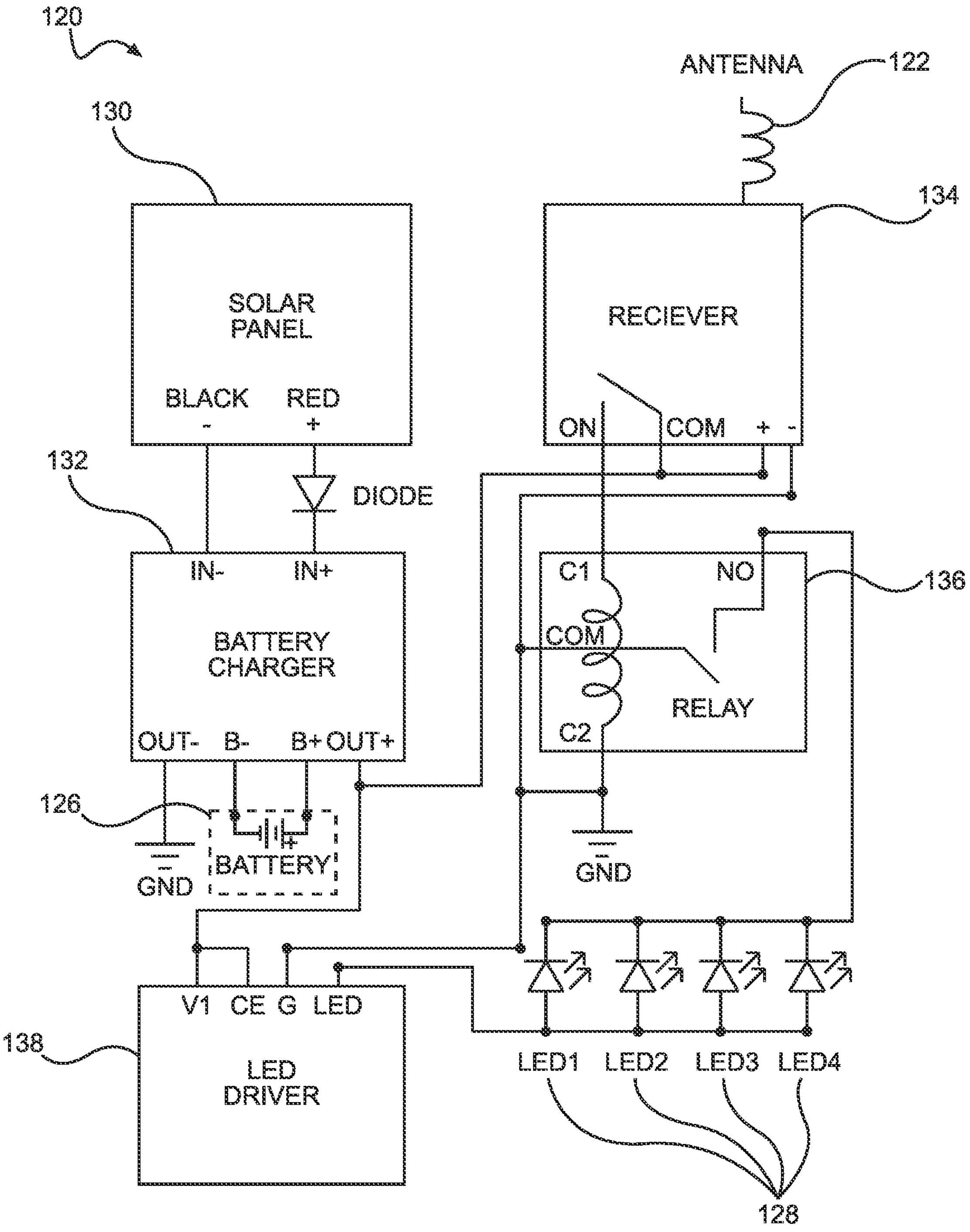
FIG. 4 is a schematic diagram of a lighting module of the illumination system of FIG. 2 in accordance with an example embodiment.

FIG. 4 is a schematic diagram of the lighting module 120 of the illumination system 100 of FIG. 2 in accordance with an example embodiment. As noted above, in some embodiments, the lighting module 120 includes an antenna 122 configured to receive an electromagnetic signal 124 (FIG. 3), a battery 126 configured to provide electrical power, and at least one light source 128 operatively coupled to the battery 126 and to the antenna 122. The light source 128 is configured to receive electrical power from the battery 126 and to emit light outwardly from the housing 102 in response to the electromagnetic signal 124 received by the antenna 122. In the embodiment shown in FIG. 4, the lighting module 120 includes four light sources 128, each light source 128 being a light emitting diode (LED). In other embodiments, other numbers or types of light sources 128 may suitably be employed.

In some embodiments, the lighting module 120 may also include a solar panel 130 operatively coupled to a battery charger 132. The solar panel 130 may be positioned on an outer surface of the housing 102 (e.g. on the top portion 108) and converts sunlight into electricity which is provided to the battery charger 132. In turn, the battery charger 132 is operatively coupled to the battery 126 and is configured to charge the battery 126 using the electricity received from the solar panel 130.

In some embodiments, the lighting module 120 includes a receiver 134 that is operatively coupled between the antenna 122 and a relay 136. In some embodiments, the relay 136 is operatively coupled to an LED driver 138. Accordingly, when the antenna 122 receives the electromagnetic signal 124 from the transmitter module 140, the receiver 134 detects the electromagnetic signal 124 and signals the relay 136 that the electromagnetic signal 124 has been received. The relay 136 then actuates the LED driver 138 to provide electrical power from the battery 126 to the light sources 128. Accordingly, the light sources 128 of the lighting module 120 are activated in response to the electromagnetic signal 124 from the transmitter module 140 to emit light outwardly from the illumination system 100.

Accordingly, in some embodiments, an illumination system 100 for illuminating a hydrant 50 having a pole 52 extending upwardly therefrom to improve visible detection of the hydrant 50 comprises a housing 102 having a mount portion 112 defining an aperture that fittingly engages onto an upper end 54 of the pole 52 to position the housing 102 above the hydrant 50, and a lighting module 120 at least partially disposed within the housing 102. In some embodiments, the lighting module 120 includes an antenna 122 configured to receive an electromagnetic signal 124, a battery 126 configured to provide electrical power, and at least one light source 128 operatively coupled to the battery 126 and to the antenna 122, the at least one light source 128 being configured to emit light outwardly from the housing 102 in response to the electromagnetic signal 124 received by the antenna 122. In some embodiments, the illumination system 100 further includes a transmitter module 140 configured to be positioned remotely from the housing 102, the transmitter module 140 being configured to transmit the electromagnetic signal 124 to the antenna 122 to actuate the at least one light source 128.

In some embodiments, the lighting module 120 further includes a solar panel 130 disposed on an outer surface of the housing 102 and configured to provide a recharging current to the battery 126. And in some embodiments, the at least one light source 128 includes a plurality of light-emitting diodes (LEDs). In some embodiments, the lighting module 120 further includes: a receiver 134 operatively coupled to the antenna 122 and configured to detect when the antenna 122 receives the electromagnetic signal 124; a relay 136 operatively coupled to the receiver 134 and configured to receive an indication signal from the receiver 134 when the electromagnetic signal 124 is received; and an LED driver 138 operatively coupled to the relay 136 and to the one or more LEDs, the LED driver 138 being configured to provide electrical power from the battery 126 to the one or more LEDs when actuated by the relay 136.

D. Transmitter Module

As noted above, in some embodiments, the illumination system 100 includes a transmitter module 140 configured to be positioned remotely from the housing 102 and configured to transmit the electromagnetic signal 124 to the antenna 122 to actuate the at least one light source 128. In some embodiments, the transmitter module 140 may be a mobile device that may be carried by a person (e.g. fireman, police officer, etc.), or may be positioned within a vehicle 150 (e.g. a firetruck, etc.).

Figure 5:
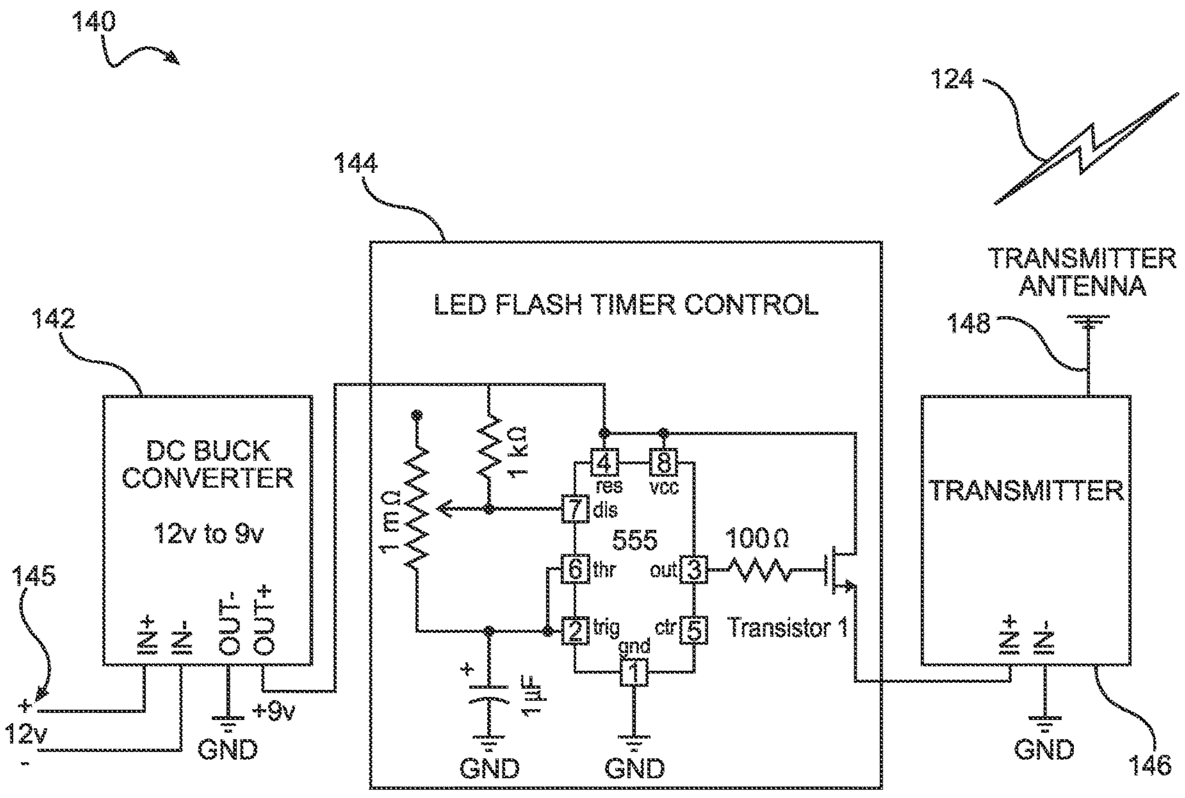
FIG. 5 is a schematic diagram of a transmitter module of the illumination system of FIG. 3 in accordance with an example embodiment.

FIG. 5 is a schematic diagram of a transmitter module 140 in accordance with an example embodiment. In some embodiments, the transmitter module 140 includes a converter 142 operatively coupled between a controller 144 and a power source 145. In some embodiments, the power source 145 may be a battery that is portable with the transmitter module 140, or alternately, may be a battery or other suitable power source that is external to the transmitter module 140, such as a battery of the vehicle 150. The converter 142 may be configured to convert (or condition) the power received from the power source 145 before being supplied to the controller 144. For example, in some embodiments, the converter 142 may be a DC converter that reduces a voltage of the electrical power from the power source 145, and provides the reduced voltage power to the controller 144.

In some embodiments, the transmitter module 140 includes a transmitter 146 operatively coupled to the controller 144, and a transmitter antenna 148 operatively coupled to the transmitter 146. More specifically, the controller 144 may be configured to provide control signals to the transmitter 146 to cause the transmitter 146 to send the electromagnetic signal 124 from the transmitter antenna 148. In some embodiments, the controller 144 may cause the transmitter 146 to intermittently transmit the electromagnetic signal 124 from the transmitter antenna 148 in one or more pulses at a desired rate and for a desired duration. In other embodiments, the controller 144 may cause the transmitter 146 to continuously (or semi-continuously) transmit the electromagnetic signal 124 from the transmitter antenna 148. In some embodiments, the controller 144 may include an LED flash timer controller that causes the transmitter 146 to emit the electromagnetic signal 124 via the transmitter antenna 148 at a pre-determined timing sequence in order to cause the light sources 128 of the illumination system 100 to become illuminated (see FIG. 3) to improve visible detection of the hydrant 50 by interested personnel.

Accordingly, in some embodiments, an illumination system 100 for illuminating a hydrant 50 to improve visible detection of the hydrant 50 comprises a housing 102 that includes a base portion 104 and a tubular member (e.g. mount portion 112) that projects downwardly from the base portion 104, the tubular member defining an aperture that fittingly engages engage onto a projecting support (e.g. pole 52) that extends upwardly to position the housing 102 above the hydrant 50, and a lighting module 120 at least partially disposed within the housing 102. In some embodiments, the lighting module 120 includes: an antenna 122 configured to receive an electromagnetic signal 124; a battery 126 configured to provide electrical power; a solar panel 130 disposed on an outer surface of the housing 102 and configured to provide a recharging current to the battery 126; and at least one light source 128 operatively coupled to the battery 126 and to the antenna 122, the at least one light source 128 being configured to emit light outwardly from the housing 102 in response to the electromagnetic signal 124 received by the antenna 122. In some embodiments, the illumination system 100 further includes a transmitter module 140 configured to be positioned remotely from the housing 102, the transmitter module 140 being configured to transmit the electromagnetic signal 124 to the antenna 122 to actuate the at least one light source 128.

In some embodiments, the housing 102 comprises a central portion 106 having a cylindrical shape and at least one window 110 circumferentially disposed about the central portion 106, the at least one light source 128 being configured to emit light outwardly from the housing 102 through the at least one window 110. And in some embodiments, the at least one light source 128 comprises one or more light-emitting diodes (LEDs), and the lighting module 120 further includes: a receiver 134 operatively coupled to the antenna 122 and configured to detect when the antenna 122 receives the electromagnetic signal 124; a relay 136 operatively coupled to the receiver 134 and configured to receive an indication signal from the receiver 134 when the electromagnetic signal 124 is received; and an LED driver 138 operatively coupled to the relay 136 and to the one or more LEDs, the LED driver 138 being configured to provide electrical power from the battery 126 to the one or more LEDs when actuated by the relay 136.

In addition, in some embodiments, the transmitter module 140 includes a controller 9 operatively coupled to a transmitter 146 and configured to provide a control signal to the transmitter 146 to cause the transmitter 146 to transmit the electromagnetic signal 124 via a transmitter antenna 148 to actuate the at least one light source 128. And in some embodiments, the transmitter module 140 further includes a converter 142 operatively coupled between the controller 144 and a power source 145, the converter 142 being configured to condition power received from the power source 145 before being supplied to the controller 144.

Illumination systems in accordance with the present disclosure may provide considerable advantages over prior art systems. For example, embodiments of illumination systems in accordance with the present disclosure may advantageously improve the visibility of a hydrant (and pole) during periods of poor visibility, such as during night operations, during periods of inclement weather (e.g. rain, snow, fog, etc.), or in the event that visibility is reduced due to a fire or other emergency condition (e.g. smoky conditions). In addition, illumination systems in accordance with the present disclosure may greatly assist first responders or other personnel who may be unfamiliar with the locations of hydrants in the area of an emergency incident, such as first responders from neighboring districts who are arriving to the area to provide assistance to local authorities.

While various embodiments have been described above, it should be understood that they have been presented by way of example only, and not limitation. The descriptions are not intended to limit the scope of the technology to the particular forms set forth herein. To the contrary, the present descriptions are intended to cover such alternatives, modifications, and equivalents as may be included within the spirit and scope of the technology as defined by the appended claims and otherwise appreciated by one of ordinary skill in the art. The various embodiments of the present disclosure may be embodied in other specific forms without departing from the spirit or essential attributes thereof, and it is therefore desired that the various embodiments in the present disclosure be considered in all respects as illustrative and not restrictive. Thus, the breadth and scope of a preferred embodiment should not be limited by any of the above-described exemplary embodiments.

Unless otherwise defined, all technical and scientific terms used herein have the same meaning as commonly understood by one of ordinary skill in the art to which this invention belongs. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. Any headings utilized within the description are for convenience only and have no legal or limiting effect.

What is claimed is:

1. An illumination system for illuminating a hydrant to improve visible detection of the hydrant, comprising:
   - a housing having a mount portion that engages a projecting support that extends upwardly to position the housing above the hydrant; and
   - a lighting module at least partially disposed within the housing, the lighting module including:
     - an antenna that receives a wireless electromagnetic signal from a mobile device that is remotely positioned from the antenna;
     - a battery that provides electrical power; and
     - at least one light source operatively coupled to the battery and to the antenna, wherein the at least one light source emits light outwardly from the housing in response to the electromagnetic signal received by the antenna.

2. The illumination system of claim 1, wherein the projecting support comprises a pole that projects upwardly from the hydrant, and wherein the mount portion includes a cylindrical aperture that slides onto and fittingly engages an upper end of the pole.

3. The illumination system of claim 1, wherein the projecting support comprises a pole that projects upwardly from the hydrant, and wherein the mount portion includes a tubular member that projects downwardly from a base portion of the housing, the tubular member defining a cylindrical aperture that slides onto and fittingly engages an upper end of the pole.

4. The illumination system of claim 1, wherein the housing includes at least one window, wherein the at least one light source being emits light outwardly from the housing through the at least one window.

5. The illumination system of claim 1, wherein the housing comprises a central portion having a cylindrical shape and at least one window circumferentially disposed about the central portion, wherein the at least one light source emits light outwardly from the housing through the at least one window.

6. The illumination system of claim 1, wherein the housing includes at least one window formed of a tinted transparent material and wherein the at least one light source emits light outwardly from the housing through the at least one window.

7. The illumination system of claim 1, the lighting module further includes a solar panel disposed on an outer surface of the housing and wherein the solar panel recharges the battery.

8. The illumination system of claim 1, wherein the at least one light source comprises a plurality of light-emitting diodes.

9. The illumination system of claim 1, wherein the at least one light source comprises one or more light-emitting diodes (LEDs), and wherein the lighting module further includes:

a receiver operatively coupled to the antenna that detects when the antenna receives the electromagnetic signal;

a relay operatively coupled to the receiver that receives an indication signal from the receiver when the electromagnetic signal is received; and an LED driver operatively coupled to the relay and to the one or more LEDs, wherein the LED driver provides electrical power from the battery to the one or more LEDs when actuated by the relay.

10. The illumination system of claim 1, further comprising a transmitter module housed within the mobile device, wherein the transmitter module transmits the electromagnetic signal to the antenna.

11. The illumination system of claim 10, wherein the transmitter module includes:

a controller operatively coupled to a transmitter, wherein the controller provides a control signal to the transmitter causing the transmitter to transmit the electromagnetic signal via a transmitter antenna.

12. The illumination system of claim 11, wherein the transmitter module further includes:

a converter operatively coupled between the controller and a power source, wherein the converter conditions power received from the power source before being supplied to the controller.

13. An illumination system for illuminating a hydrant having a support extending upwardly therefrom to improve visible detection of the hydrant, comprising:

a housing having a mount portion that engages an upper end of the support to position the housing above the hydrant; and a lighting module at least partially disposed within the housing, the lighting module including:

an antenna that receives a wireless electromagnetic signal from a mobile device that is remotely positioned from the antenna;

a battery that provides electrical power; and at least one light source operatively coupled to the battery and to the antenna, wherein the at least one light source emits light outwardly from the housing in response to the electromagnetic signal received by the antenna; and a transmitter module within the mobile device that transmits the electromagnetic signal to the antenna to actuate the at least one light source.

14. The illumination system of claim 13, wherein the housing comprises a base portion having a tapered shape and a mount portion having a tubular member that projects downwardly from the base portion, the tubular member defining an aperture that fittingly engages the upper end of the support.

15. The illumination system of claim 13, wherein the housing comprises a central portion having a cylindrical shape and at least one window circumferentially disposed about the central portion, wherein the at least one light source emits light outwardly from the housing through the at least one window.

16. The illumination system of claim 13, wherein the battery comprises a rechargeable battery, and wherein the lighting module further includes a solar panel disposed on an outer surface of the housing, wherein the battery provides a recharging current to the rechargeable battery.

17. An illumination system for illuminating a hydrant to improve visible detection of the hydrant, comprising:

a housing that engages a projecting support that extends upwardly to position the housing above the hydrant; and a lighting module at least partially disposed within the housing, the lighting module including:

an antenna that receives a wireless electromagnetic signal from a mobile device that is remotely positioned from the antenna;

a battery that provides electrical power;

a solar panel disposed on an outer surface of the housing, wherein the solar panel recharges the battery; and at least one light source operatively coupled to the battery and to the antenna, wherein the at least one light source emits light outwardly from the housing in response to the electromagnetic signal received by the antenna.

18. The illumination system of claim 17, wherein the housing comprises a central portion having a cylindrical shape and at least one window circumferentially disposed about the central portion, wherein the at least one light source emits light outwardly from the housing through the at least one window.

19. The illumination system of claim 17, wherein the at least one light source comprises one or more light-emitting diodes (LEDs), and wherein the lighting module further includes:

a receiver operatively coupled to the antenna that detects when the antenna receives the electromagnetic signal;

a relay operatively coupled to the receiver that receives an indication signal from the receiver that the electromagnetic signal has been received; and an LED driver operatively coupled to the relay and to the one or more LEDs, wherein the LED driver provides electrical power from the battery to the one or more LEDs responsive to actuation of the relay.

20. The illumination system of claim 17, wherein the transmitter module further includes a controller operatively coupled to a transmitter, wherein the controller provides a control signal to the transmitter causing the transmitter to transmit the electromagnetic signal via a transmitter antenna to actuate the at least one light source.

21. The illumination system of claim 1, wherein the support with which the housing is engaged comprises a support that marks the presence of an existing hydrant.

* * * * *